(12) United States Patent
Penza et al.

(10) Patent No.: US 9,945,092 B2
(45) Date of Patent: Apr. 17, 2018

(54) SYSTEM AND METHOD FOR UTILITY MAINTENANCE

(71) Applicant: ULC ROBOTICS, INC., Hauppauge, NY (US)

(72) Inventors: G. Gregory Penza, Old Field, NY (US); Robert E. Kodadek, III, Long Beach, NY (US)

(73) Assignee: ULC Robotics, Inc., Hauppauge, NY (US)

( * ) Notice: Subject to any disclaimer, the term of this patent is extended or adjusted under 35 U.S.C. 154(b) by 51 days.

(21) Appl. No.: 14/976,101

(22) Filed: Dec. 21, 2015

(65) Prior Publication Data

US 2016/0177540 A1 Jun. 23, 2016

(51) Int. Cl.
| | | |
|---|---|---|
| *E02F 3/28* | (2006.01) | |
| *B62D 25/24* | (2006.01) | |
| *E02F 3/88* | (2006.01) | |
| *E02F 9/24* | (2006.01) | |
| *E02F 3/96* | (2006.01) | |
| *E02F 9/26* | (2006.01) | |
| *B25J 11/00* | (2006.01) | |

(52) U.S. Cl.
CPC ............... *E02F 3/28* (2013.01); *B25J 11/00* (2013.01); *B62D 25/24* (2013.01); *E02F 3/8825* (2013.01); *E02F 3/96* (2013.01); *E02F 9/245* (2013.01); *E02F 9/264* (2013.01)

(58) Field of Classification Search
CPC ........ B62D 25/20; B62D 25/24; B62D 33/04; B62D 39/00
USPC ................................. 296/24.32, 25
See application file for complete search history.

(56) References Cited

U.S. PATENT DOCUMENTS

| 4,653,316 A | 3/1987 | Fukuhara |
| 5,192,953 A * | 3/1993 | Tomita ..................... G01V 3/15 |
| | | 173/28 |
| 5,287,740 A * | 2/1994 | Tomita .................... G01S 13/02 |
| | | 342/22 |
| 5,333,969 A | 8/1994 | Blaha et al. |
| 5,835,053 A | 11/1998 | Davis |
| 7,329,161 B2 * | 2/2008 | Roering .................. B60F 3/003 |
| | | 280/43.17 |

(Continued)

FOREIGN PATENT DOCUMENTS

| DE | 7422097 U | 7/1975 |
| EP | 0 277 326 A2 | 8/1988 |

(Continued)

OTHER PUBLICATIONS

Search Report in Application No. GB1522513.9 dated Feb. 25, 2016.

(Continued)

*Primary Examiner* — Gary S Hartmann
(74) *Attorney, Agent, or Firm* — Brooks Kushman P.C.

(57) ABSTRACT

A system and method for utility maintenance may include a robotic system having an articulating arm capable of utilizing a variety of tools and sensors for locating and accessing underground structures. The robotic system may be contained within a truck or other vehicle that provides access to the ground through the floor of the vehicle or truck bed. A curtain may be extended from a bottom of the vehicle to the ground to enclose a work site and inhibit visual and physical access to it.

12 Claims, 8 Drawing Sheets

(56) References Cited

U.S. PATENT DOCUMENTS

| | | | |
|---|---|---|---|
| 7,729,836 | B2 | 6/2010 | Gilchrist |
| 9,057,221 | B2 | 6/2015 | Warr |
| 2005/0253417 | A1* | 11/2005 | Cundy ...................... B60P 3/07 296/168 |
| 2006/0162755 | A1* | 7/2006 | Platek ................... E04H 15/001 135/88.15 |
| 2010/0301624 | A1 | 12/2010 | Boos et al. |
| 2012/0211042 | A1* | 8/2012 | Richter ................. E04H 15/001 135/143 |

FOREIGN PATENT DOCUMENTS

| | | |
|---|---|---|
| EP | 0 283 286 A3 | 9/1988 |
| EP | 0 485 189 A2 | 5/1992 |
| GB | 1377359 | 12/1974 |

OTHER PUBLICATIONS

Zhang et al., "The Challenges of Integrating an Industrial Robot on a Mobile Platform," 2010 Institute of Electrical and Electronics Engineers, International Conference on Automation and Logistics, Aug. 16-20, 2010, Hong Kong and Macau.

* cited by examiner

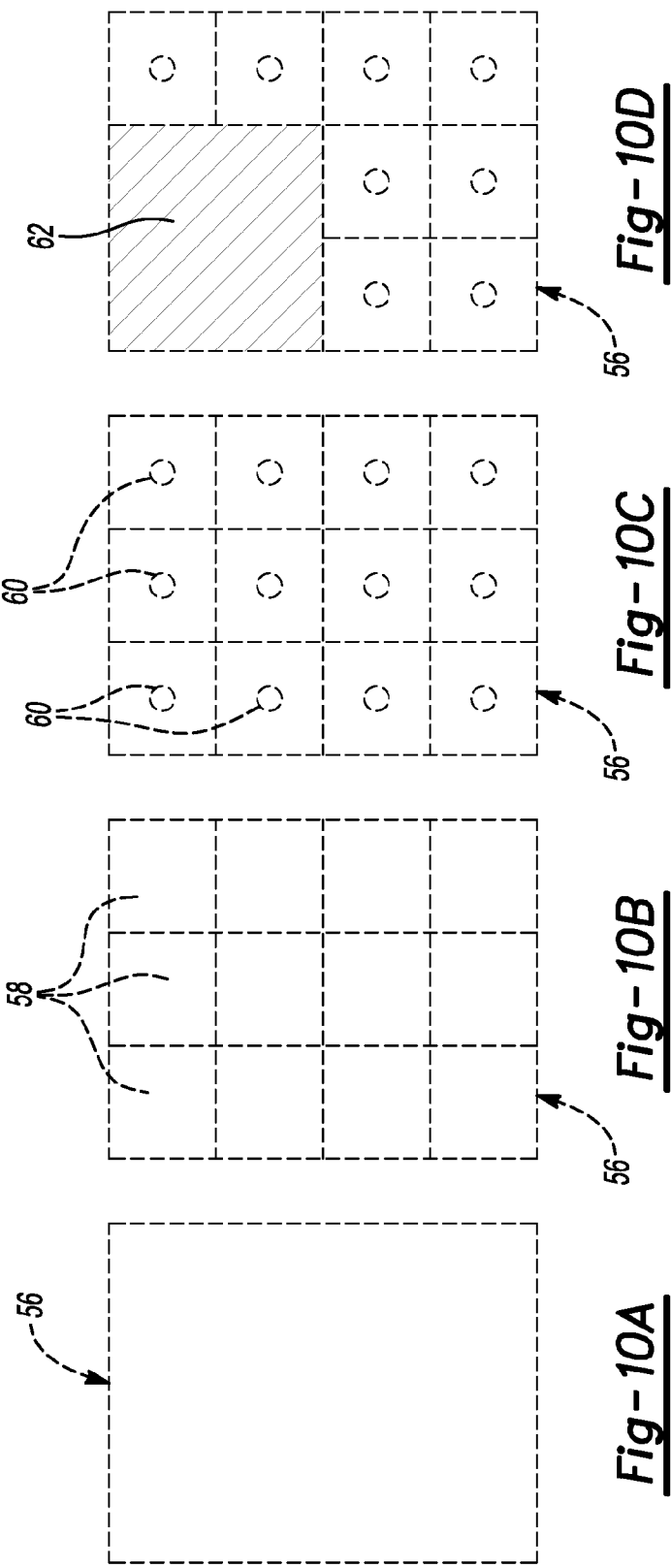

SYSTEM AND METHOD FOR UTILITY MAINTENANCE

CROSS-REFERENCE TO RELATED APPLICATIONS

This application claims the benefit of U.S. provisional application No. 62/094,748 filed 19 Dec. 2014, which is hereby incorporated herein by reference.

TECHNICAL FIELD

The present invention relates to a system and method for utility maintenance.

BACKGROUND

Operations and maintenance costs represent a major portion of a typical utility company's budget. Utility excavations as they are performed today are very labor-intensive and disruptive, but they are necessary to repair aging infrastructure and install new equipment. Multiple crews are required to perform utility locating, mark-out, excavation, sheeting and shoring, and restoration. Additional staff are engaged to support the excavation, including project managers, vehicle drivers, equipment operators, and administrative personnel. A single excavation may represent a major investment of time, money, personnel, and equipment. The costs of these excavations are often passed-on to the utility customer.

Engaging large crews to perform excavations requires dedicating resources to labor-intensive projects. In spite of technological advances that offer improvements in cost and productivity in some areas, utility excavations are still performed today in much the same way that they have been for decades. Typical utility excavations require deploying multiple large vehicles, heavy equipment, and multiple crews. The large site-footprint required for utility vehicles and heavy excavating equipment can create a public nuisance and cause major disruptions to traffic. Construction equipment and utility vehicles also have fuel economies which are significantly worse than those of passenger vehicles, leading excavation sites to have not only a large physical footprint, but a substantial carbon footprint as well. Reducing the excavation site's physical and carbon footprints would provide a positive environmental impact, reduce costs, and serve as a benefit to the public.

Prior to an excavation, mark-out crews are called to locate underground utilities. Mark-out crews use maps to locate key pipeline features and main-line routing from above ground. Once the maps are consulted, mark-out crews use spray paint on the road surface to mark the location of pipeline features prior to excavation; however, the mark-outs provided are only as accurate as the data which is available to the utility company or mark-out crew. Maps and as-built construction drawings are often inaccurate, or do not represent decades of subsequent maintenance, repair and replacement activities which have occurred. Changes to street and sidewalk layout, the construction of new buildings, the installation of new gas and other utility services, the demolition of old buildings, and other changes over the years can make it difficult to translate the old maps to the current street configuration. In addition, the underground networks of major cities can be very crowded with gas, steam, sewer, water, electrical, telecommunications, and other utilities running in close proximity to one another. These underground networks are often inadequately mapped and the locations of different utility infrastructure installed below street level are almost never integrated on the same map. This lack of integration can lead to many problems.

Damage to buried utilities can occur when the excavator is not aware, either through negligence or incomplete information, of what lies beneath the road surface. This damage is typically described in relation to the level of involvement of the utility infrastructure owner. For example, a common form of damage is referred to as "third party damage" to indicate that it is not the fault of the utility which owns the damaged infrastructure—i.e., the first party—or a direct contractor of that utility—i.e., the second party—but instead is the fault of an unaffiliated excavator—for example, a telecommunications utility crew striking and damaging natural gas infrastructure. Unfortunately, first and second parties are not immune from damaging their own infrastructure, either through insufficient excavation techniques or by not identifying the location of all buried utilities while excavating. For all of these reasons, an improved method of performing utility excavations is needed to reduce or eliminate the aforementioned problems.

SUMMARY

At least some embodiments of the invention include a system for utility maintenance that includes a vehicle having an at least partially enclosed interior space and a selectively openable floor portion movable between a closed position and an open position whereby a hatch having a hatch perimeter is defined and provides access to ground below the vehicle through a floor in the vehicle. A barrier is selectively positionable proximate to at least a portion of the hatch perimeter, and a tool is configured for deployment through the hatch and operable within the barrier to provide utility structure access.

At least some embodiments of the invention include a system for utility maintenance that includes a vehicle structure defining an interior space and having a floor. At least a portion of the floor is movable between a closed position and an open position. The open position defines a floor opening which facilitates access to ground below the vehicle structure from the interior space through the floor opening. A tool is deployable through the floor opening for operation.

At least some embodiments of the invention include a method for utility maintenance that includes moving a vehicle structure defining an interior space to a predetermined location. The interior space is positioned over a site at the predetermined location. At least a portion of a floor within the interior space is moved from a closed position to an open position to create an opening in the floor, and a tool is operated through the opening in the floor.

At least some embodiments of the invention include a system and method for performing utility maintenance that includes a robotic utility excavation system. As used herein, "utility maintenance" or "maintenance" generally may include preventative maintenance, repair maintenance, or both. It may also include the installation of new structures or components, which in the case of utility maintenance may include the installation of new pipelines or other infrastructure. Embodiments of the system may include, for example, a robotic arm used to perform excavations. The robotic arm may be equipped with an interchangeable set of sensors and tools such that the process of excavation can be automated and precisely controlled. In some embodiments, the robotic arm may be mounted in a vehicle.

At least some embodiments of the invention may include a robotic excavation system and method for excavation to expose a gas main. Some or all of the following steps may be employed. The robotic system is partially or fully contained within a vehicle such as a box truck or a semi-trailer. The vehicle arrives on site and the perimeter space to be excavated is marked out by personnel using standard mark-out spray paint. The vehicle is positioned over the area to be excavated. Using cameras and machine vision software, a robot arm scans the ground area to determine the perimeter of the excavation.

A protective curtain is then lowered from the base of the vehicle and positioned around the area to be excavated. In at least some embodiments, the robot arm works through a hole in the floor of the trailer or truck box, which may be selectively opened and closed by one or more panels. The curtain will ensure that the perimeter of the work area is clearly delineated and that debris created during the excavation process is contained. The curtain will also make the work of excavating the pit generally invisible to the public. In other embodiments, a container, separate from a vehicle, may house some or all of the robotic excavation system. In such embodiments, the container may be positioned at the excavation site and an opening in a floor of the container may provide access to the ground. The walls of the container may act to visually and physically isolate the excavation work, thereby obviating a need for a curtain as described above.

A ground-penetrating radar sensor (GPR) can be picked up by the robotic arm and used to scan the area to be excavated. Rebar, buried obstructions and features within the asphalt and/or concrete road surface can be identified through the pavement. These items can also include valve boxes and other paved-over utility and non-utility infrastructure. Using the system's onboard computer, calculations can be made to determine the size, depth and location of the cuts necessary to divide the excavation area into square sections.

The robot arm can then exchange the GPR sensor with a road cutting saw. Using cameras and machine vision software, the robot arm can cut the road surface with the saw tool or other tools along the paint marks applied to the surface of the roadway. For concrete roadways, the pavement inside the excavation may be cut into smaller pieces for easy removal, and then lifted out and placed to the side by the robot arm for reinstallation during pit restoration. For asphalt roadways, a grinding attachment can be used to pulverize the asphalt before removal using vacuum excavation. One valuable benefit that may be realized by using a robotic excavation system in accordance with embodiments of the invention is the ability to use keyhole technology, which may be equipped directly within the robotic excavation system transport vehicle. The transport vehicle may be outfitted with a mounted coring unit, or the robot arm may be designed in such a way as to perform the keyhole excavation directly. This technology can quickly and accurately remove the asphalt, asphalt-concrete, or reinforced concrete core.

A suite of sensors may be integrated into the robotic arm, in the truck or container, and on the tool changer, to help inform the control system of the presence, location and size of buried obstacles, infrastructure and potential safety concerns. Sensors mounted to the robotic arm may include pressure sensors, machine vision and magnetic detection sensors.

The control and operation of the robotic arm for the robotic excavation system may be at least semi-autonomous. As used herein, "semi-autonomous" control means a control wherein pre-programmed routines may be utilized for the excavation operation with the option for manual control modes for full or assisted manual operation. Pre-programmed and sensor-triggered interrupt points may be programmed into the excavation control sequences. It may be desirable to have an operator present to make decisions at these key interrupt points during the excavation process. Points and procedures that may require interrupts via sensor or process may include, for example: (a) review and confirmation of results from initial GPR data acquisition to ensure buried infrastructure is not present inside concrete road base, (b) go/no-go decisions related to unknown objects found in the excavation site, and (c) resetting the system following sensor interruptions related to other, predefined triggers.

Depending on the needs of the robotic excavation system, there are a number of tools and sensors that may be incorporated; for example, concrete and asphalt cutting tools such as diamond saw blades may be used. Vacuum excavation tools may be employed for quick, efficient and safe earth removal. A soil agitation tool, such as a rotating brush, may be mounted at the base of the leading end of the robot arm. The soil agitation tool may be used in conjunction with the vacuum to make vacuum excavating efficient and safe for buried pipes and conduits. Gas detectors may be used to monitor the environment during the excavation process.

The robotic excavation system may also include tools that provide repair functionality; for example, a gas-main-tap-hole installation tool. Once the pit has been excavated, it may be possible to install small diameter tap holes using the robotic excavation system. In addition, a gas main pipeline periscope inspection camera may be used. With this tool, a periscope or push rod type camera may be deployed from inside tap holes in order to perform internal pipeline video inspection. A gas-main-flow-stop-bag installation tool designed to stop the flow of natural gas by inserting an inflatable line-stopping bag may also be used. Once a pit excavation is complete the first step in a variety of repair processes is to stop off the gas utilizing this technology. A gas-main-repair-clamp installation tool may also be used. Once the pit excavation is complete and the pipeline has been inspected, it often needs to be repaired. The robotic arm may be equipped with repair clamps used to seal leaks caused by corrosion or age. In addition to these tools, other examples of tools that may be used include an external sealant-injection tool and a pressure-point installation tool.

After cutting and removing pavement as described above, the exposed ground in the excavation can then be inspected using a ground-penetrating radar attachment again. A vacuum excavation attachment including low-impact custom tooling such as rotating brushes or pressurized air-lances mounted to the truck can be used by the robotic arm to remove the dirt in the excavation. One or more sensors can be used throughout the excavation process to ensure that buried obstructions, unknown utility lines and the location of the gas main are known. The data gathered by the sensor(s) are used by the robot to know where and where not to vacuum excavate. Sensors may include gas detection sensors, GPR, electromagnetic detection sensors, ferromagnetic sensors and metal detectors. A closed loop sensor feedback network can be used to control the actions of the robotic arm. The combination of sensors and controlled excavation helps to minimize the risk of damage to buried utilities. A gripper attachment on the robot arm can be used to remove large rocks and solid debris during excavation.

Once the gas main is exposed, the surface can be scanned using a gas detection sensor to determine if any active leaks are present. The robotic arm can be used to install sheeting and shoring to secure the excavation. Data on the location and orientation of the main, GPS positioning information, video and still imagery and data about utilities found in the excavation can be stored, and reports generated for future use by the utility company. Once the pipe is exposed, the system can clean the main with a wire brush.

After the utility repair, maintenance or structure installation operations are complete, the robot arm can then be used to restore the excavation. The fill can be put back in place and the removed pavement can be restored. Some embodiments may include additional tools used to perform more operations, such as, for example, the installation of fittings, valves, small-diameter main tapping and completion, etc. Some examples of tools that could be deployed by the robotic system include: concrete and asphalt cutting tools, vacuum excavation tools, drilling tools, ground-penetrating radar, gripper or claw manipulator tools, wire brush pipe cleaning tools, gas main tapping and fitting tools, gas detectors, gas main pipeline periscope inspection cameras, gas main bag installation tools, and gas main repair clamp installation tools, just to name a few.

The operation of the robot arm can be automated, using pre-programmed routines to perform certain operations, machine vision and intelligence to perform others, and a manual mode for full or assisted manual operation. A single operator may be able to drive the vehicle and set up the operations to reduce the amount of equipment and personnel needed to perform an excavation as compared to traditional methods. In addition, if the robot is used to perform work on the gas main, workers may not need to enter the excavation.

BRIEF DESCRIPTION OF THE DRAWINGS

FIGS. 10A-10D show steps in a process of cutting pavement to access underground infrastructure;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
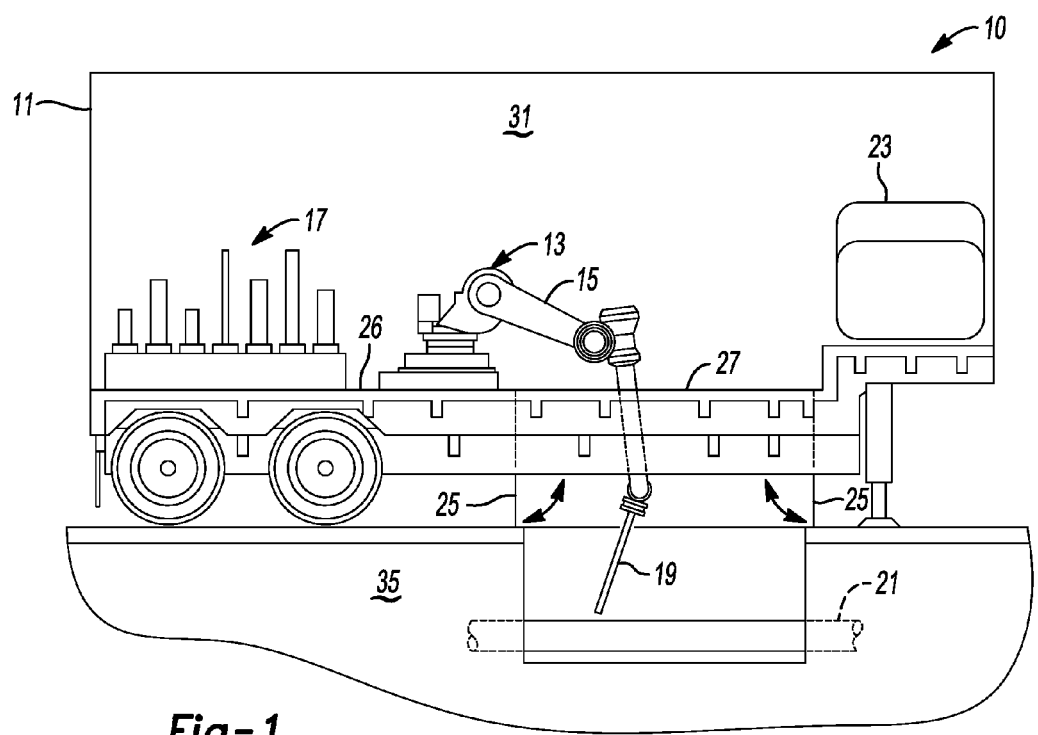
FIG. 1 shows a system in accordance with embodiments of the present invention disposed in a truck trailer.

FIG. 1 shows a system 10 in accordance with embodiments of the present invention. The system 10 is located within a vehicle structure, which in this case is a truck trailer 11, which is configured for attachment to a truck cab for transport. In some embodiments the truck trailer 11 may be part of the system itself, or it may be that a system, such as the system 10, is movable between different vehicles. A system, such as the system 10, may also be disposed within, or may include, a vehicle structure in the form of a container—e.g., a structure that is separate from a vehicle, and which moved into place at a site such as an excavation site. The trailer 11 defines an at least partially enclosed interior space 31. The system 10 includes a robotic system 13 having an articulating robotic arm 15, which, as explained in more detail below, can be used with a variety of different tools 17 and sensors. One example of a commercially available industrial robot that may be used with embodiments of the present invention is an ABB IRB 6650S offered by ABB, Inc. As shown in FIG. 1, one of the tools 19 is attached to the robotic arm 15 for use on an underground pipeline 21. A vacuum excavation tank 23 is used to collect debris from an excavation site as explained in more detail below.

Floor panels 25 are hinged from the floor or bed 26 of the trailer 11, and swing downward to create an access hatch 27, through which work can be performed. As shown in FIG. 1, the floor panels 25 are selectively openable and act as doors having an open position such as shown in the drawing figure, and are movable to a closed position—as indicated by the curved directional arrows—where they are essentially parallel with the rest of the floor 26. In other embodiments, floor panels or doors may not be hinged, but rather, may lift upward into the interior space 31 of the trailer 11, or may be slidable parallel to the floor 26 to form the hatch opening. At least some embodiments of the present invention provide the advantage of having a relatively large opening through the floor or truck bed, which allows a variety of operations to be performed. In some embodiments, the size of the hatch may be approximately two feet by three feet, which may allow for an excavation opening in the ground that is slightly smaller. In other embodiments, the size of the hatch may be larger or smaller, in length, width, or both. A non-limiting range of hatch sizes for different embodiments may be, for example, from one foot by one foot—which may be sufficient for drilling purposes—to seven feet by forty feet for large excavations where the vehicle structure is, for example, a semitrailer. The hatch 27 facilitates access from the interior space 31 to the ground 35 below the trailer 11, and more specifically, below the hatch 27. Although it is contemplated that once a hatch or other opening is provided in the floor of the vehicle structure, direct access to the ground below will be possible; however, facilitating access through the hatch does not preclude the possibility that other portions of a vehicle structure, such as the trailer 11, will need to be moved or otherwise opened to gain access to the ground.

As explained in more detail below, floor panels, such as the panels 25, may be part of a barrier and surround some or all of the excavation site. In the embodiment shown in FIG.

1, two of the panels 25 are shown—one disposed toward a front of the vehicle and one disposed toward a rear of the vehicle. In other embodiments, more than two floor panels may swing downward from the bed of the truck, for example, panels may swing down toward the front and rear as shown in FIG. 1, and may also swing down along each side of the truck, thereby covering the excavation site on four sides. Thus, the panels may form a part of the floor or truck bed when folded-up, and may act to isolate the worksite both visually and physically when folded-down.

Figure 2:
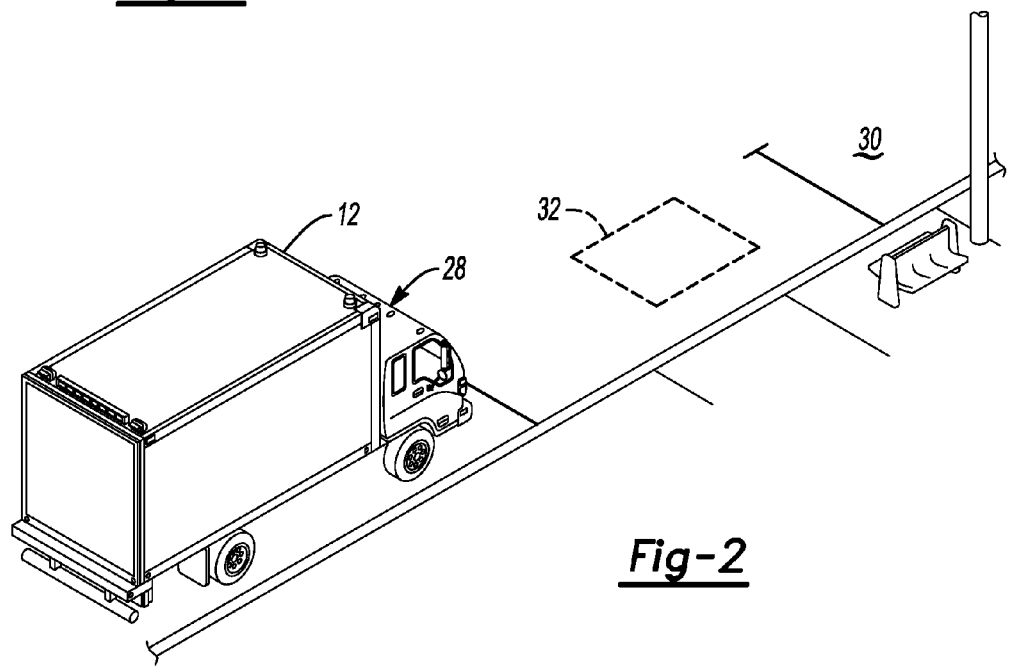
FIG. 2 shows a system in accordance with embodiments of the present invention, including a vehicle, approaching an excavation site.
Figure 3:
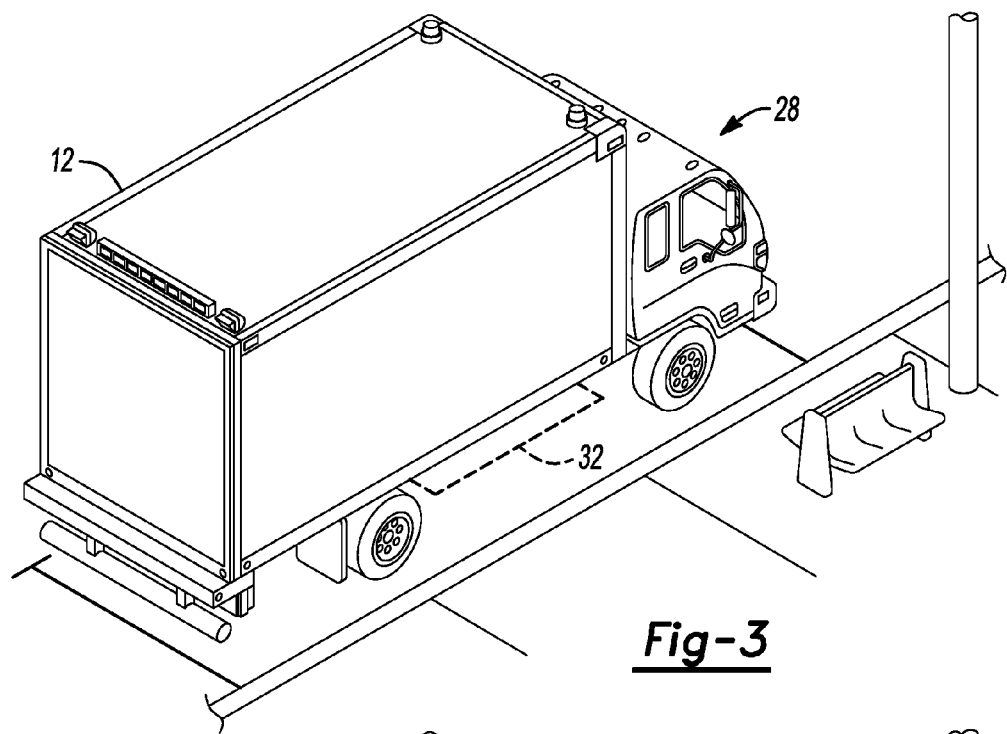
FIG. 3 shows the vehicle of FIG. 2 disposed over the excavation site.
Figure 4:
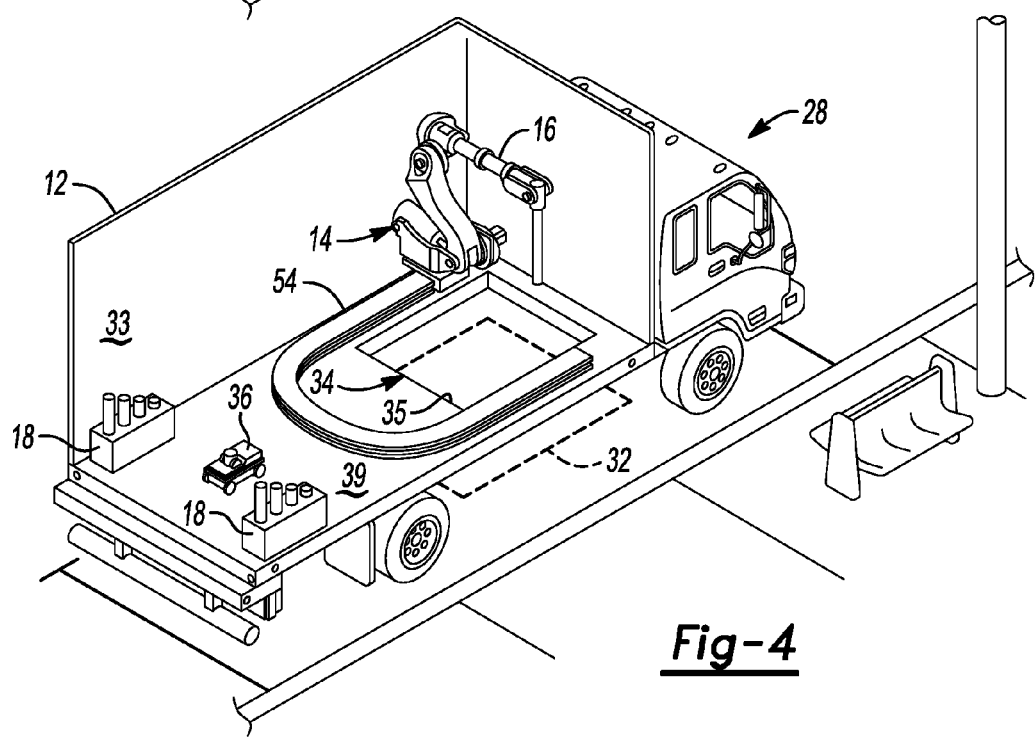
FIG. 4 shows the system of FIG. 2 accessing the excavation site through an opening in the vehicle bed.

In FIG. 2, a system 28 in accordance with embodiments of the invention is illustrated as it approaches an excavation site delineated by lines 32 painted onto a street 30, which may be concrete, asphalt, other materials, or some combination thereof. As shown in more detail in FIG. 3, the system 28 includes a vehicle structure, which in this embodiment is a self-propelled vehicle, and more specifically, a box truck 12; however, embodiments of the invention may include or otherwise be disposed in other types of vehicle structures, including vehicles that are not completely enclosed, but may be open at the roof, at one or more sides, the rear, or even the front of the vehicle. As shown in FIG. 3, the vehicle 12 is positioned directly over the excavation site 32. FIG. 4 shows a partial cutaway view of the system 28 and reveals a robotic system 14 having an articulating robotic arm 16, and which is movable about a track 54 mounted to the truck bed 39, as further explained in conjunction with FIG. 13. Toolsets 18, which include one or more excavation tools, are available for use by the robotic arm 16.

The vehicle 12 defines an interior space 33 and includes a floor or bed 39. An opening 34, which provides an access hatch, is disposed in the floor 39. A portion of the floor 39 may be selectively openable, for example, with doors such as illustrated in FIG. 1. When the floor panels are in an open position, the robotic system 14 will access the excavation site 32 through the opening 34. As explained in more detail below, a sensor arrangement, which may include one or more sensors, may also be articulated by the robotic arm 16. One such sensor arrangement is a ground-penetrating radar (GPR) unit 36 which can be used to locate of various structures such as pipelines below the surface of the street 30. Various sensor arrangements, as further described below, can be used to provide information about one or more parameters related to the excavation, and in particular, one or more parameters related to utility structure placement. This includes information related to the position of existing structures to perform maintenance on them, and also includes information related to the position of existing structures vis-à-vis the proposed location for new installations.

Figure 5:
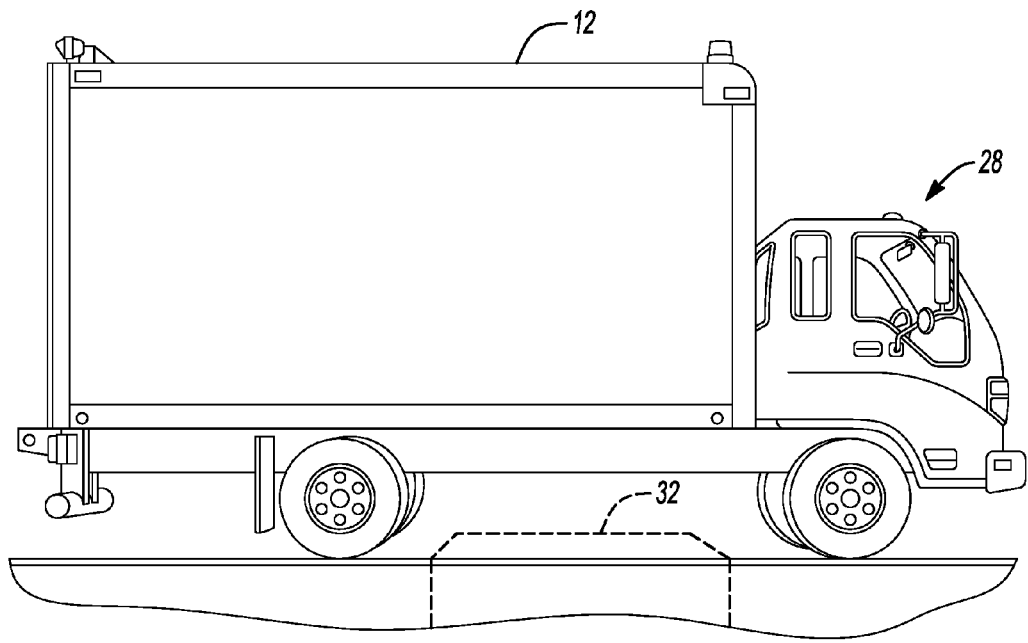
FIG. 5 shows a side view of the vehicle disposed over the excavation site.
Figure 6:
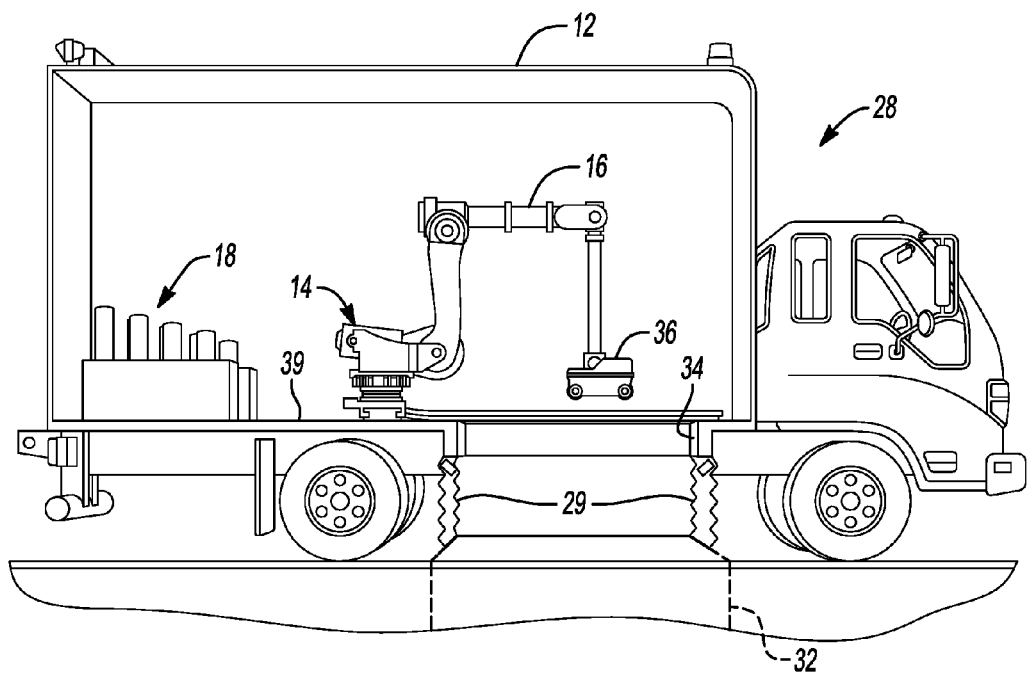
FIG. 6 shows a partial cutaway view of the vehicle as work begins on the excavation site.

FIG. 5 shows a side view of the system 28, and in particular of the truck 12, as it sits over top of the excavation site 32. By using a system, such as the system 28, which includes a vehicle structure—such as a self-propelled vehicle like the box truck 12 or a non-self-propelled vehicle structure like the trailer 11—an excavation site, such as the excavation site 32, can be generally concealed from the public, both in terms of visual and physical access to the site. In addition to the barrier imposed by the truck 12, the system 28 also includes a barrier, which in this embodiment is a retractable curtain system 29, as shown in FIG. 6. The retractable curtain system 29 is only illustrated with portions toward the front and rear of the vehicle 12; however, it is understood that such a curtain system can, and in many cases will, be disposed around the entire perimeter of an excavation site, such as the excavation site 32. The curtain 29 may be a single, wrap-around piece of material, or it may be made up of several panels of flexible material connected or disconnected from each other.

In both the embodiment shown in FIG. 1, and the embodiment shown in FIG. 6, the barrier—respectively the floor panels 25 and the curtain 29—is extendable from the floor opening toward the ground below the vehicle structure. In the case of the curtain 29, it is deployable through the opening 34 in the floor 39. In either case, the barrier formed is selectively positionable proximate to at least a portion of a perimeter of the opening her hatch—see, for example, the perimeter 35 of the opening 34 shown in FIG. 4.

The curtain 29 may be made from a heavy material of the type that will contain relatively large pieces of debris as the ground is excavated; it may also be opaque such that visual access is inhibited. As described above, when a robotic excavation system, such as the system 28, is disposed within a container, the outside walls of the container may perform the isolating function of the curtain system. A seal, not shown in FIG. 6, may be disposed along a bottom edge of the curtain 29 to prevent water or other liquids from entering the excavation pit. In addition to containing large pieces of debris, a curtain, such as the curtain 29 can help to keep small debris, including dust and other airborne particulate, contained during excavation. To keep the tools and the robotic system itself from being damaged by such airborne particulate, a system, such as the system 28, may also include a ventilation and/or dust collection system to capture such particulate.

Figure 7:
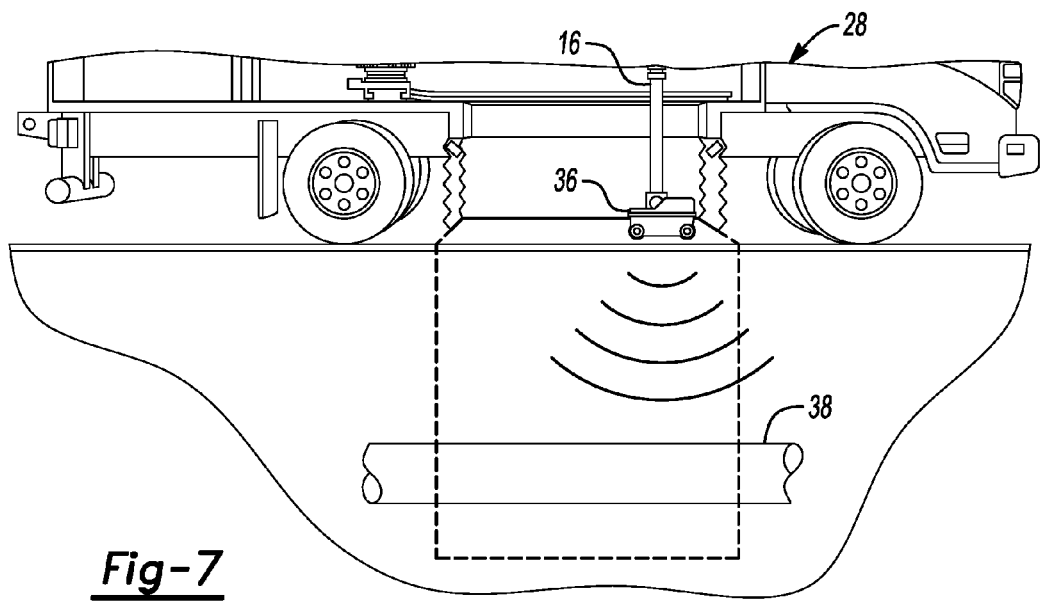
FIG. 7 shows the system using ground-penetrating radar to locate a pipeline beneath the excavation site.
Figure 8:
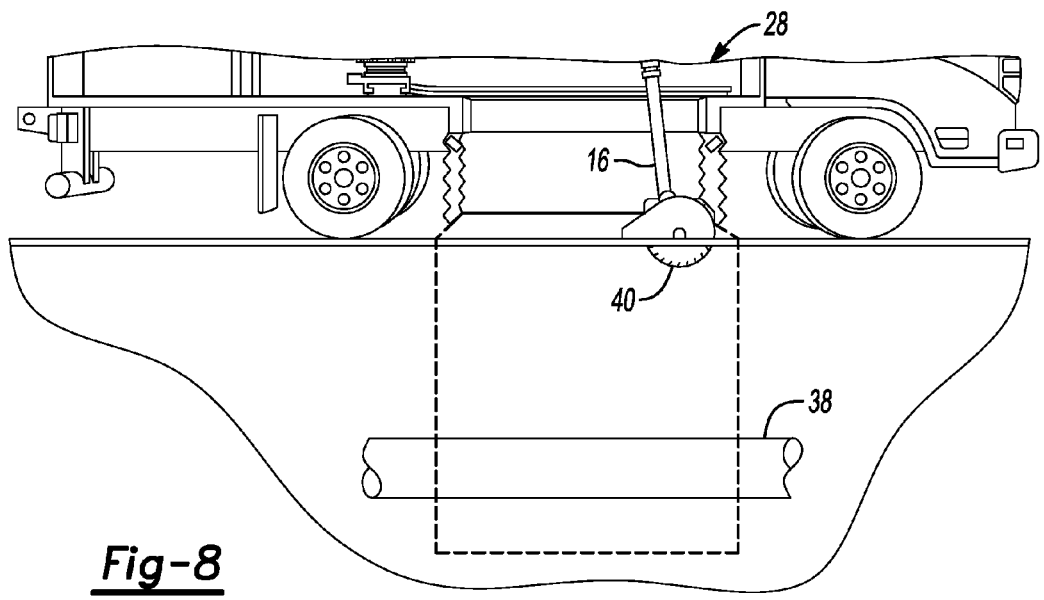
FIG. 8 shows the system cutting into the pavement at the excavation site.
Figure 9:
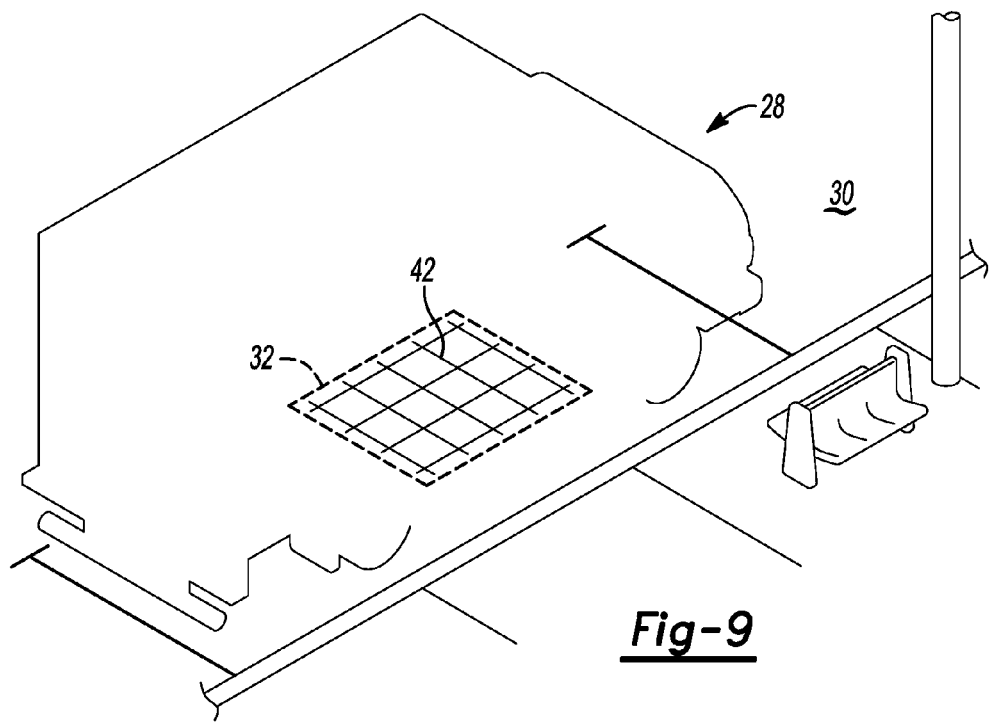
FIG. 9 shows a grid of lines cut through the pavement to access the underground pipeline.

FIG. 7 shows the system 28, and in particular the robotic arm 16, using the GPR unit 36 to detect an underground pipeline 38. Once the pipeline 38 is detected, the robotic arm 16 can be articulated to swap out the GPR unit 36 with a concrete saw 40—see FIG. 8. This may be the result of an automated, preprogrammed process, or it may be through partial or full manual control. The saw 40 may include a carbide, diamond, or other abrasive blade, or it may be a concrete saw with a chainsaw blade. FIG. 9 shows a series of cut lines 42 made by the saw 40 in preparation of removing debris from the street 30. To facilitate accurate cutting at the excavation site 32, cameras and machine vision software can be used to guide the robotic arm 16. In addition to cutting a grid, such as illustrated in FIG. 9, holes may also be drilled into the street 30 at the excavation site 32 to further facilitate removal of the concrete, asphalt, or other street material. In at least some instances, the robotic system 14 can also be used to remove pieces of the street material for reinsertion when the excavation site is closed.

FIGS. 10A-10D show certain steps associated with cutting through the street material to access the ground, and ultimately the utility infrastructure, below. In FIG. 10A, the outside perimeter of the excavation is cut with a road saw as indicated by the dashed line 56. The perimeter cut 56 is then cross cut into smaller rectangular sections 58—only some of which are labeled—as shown in FIG. 10B. At some location in the interior of each of these smaller cross-cut sections 58, usually at approximately the center of the section, a hole is drilled through the concrete or other road material—see the holes 60, again only some of which are labeled, shown in FIG. 10C. finally, a lifting hook is inserted into the holes 60 of each of the sections 58, and the sections 58 are lifted out of the excavation area for access to the ground 62 below the road material.

After the street material has been removed, the GPR unit 36 may be used again by the robotic arm 16 to determine if additional underground structures exist near the location of the pipeline 38. Other types of sensors may be used as an alternative to, or in conjunction with, a GPR unit. For example, the system 28 may include a suite of sensors that can be used in conjunction with the robotic system 14. These sensors may be used at various times throughout the excavation of the site to ensure that buried obstructions, such as rebar, unknown utility lines, valve boxes and other paved-over utility and non-utility structures are located. Such sensors may include gas detection sensors, electromagnetic detection sensors, ferromagnetic sensors and other metal detectors. Other types of sensors, for example, LiDar (light detection and ranging) and optical recognition sensors can also be used to gather relevant data. This data can be used by the robotic system 14 to know where to cut and where to remove the ground material.

Figure 11:
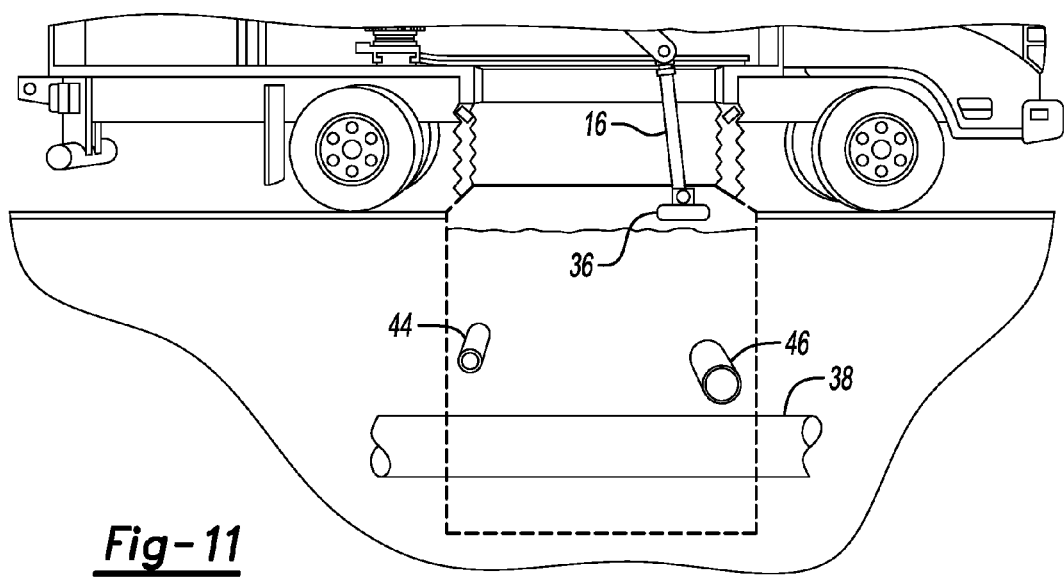
FIG. 11 shows further use of ground-penetrating radar to locate additional infrastructure in the vicinity of the pipeline.
Figure 12:
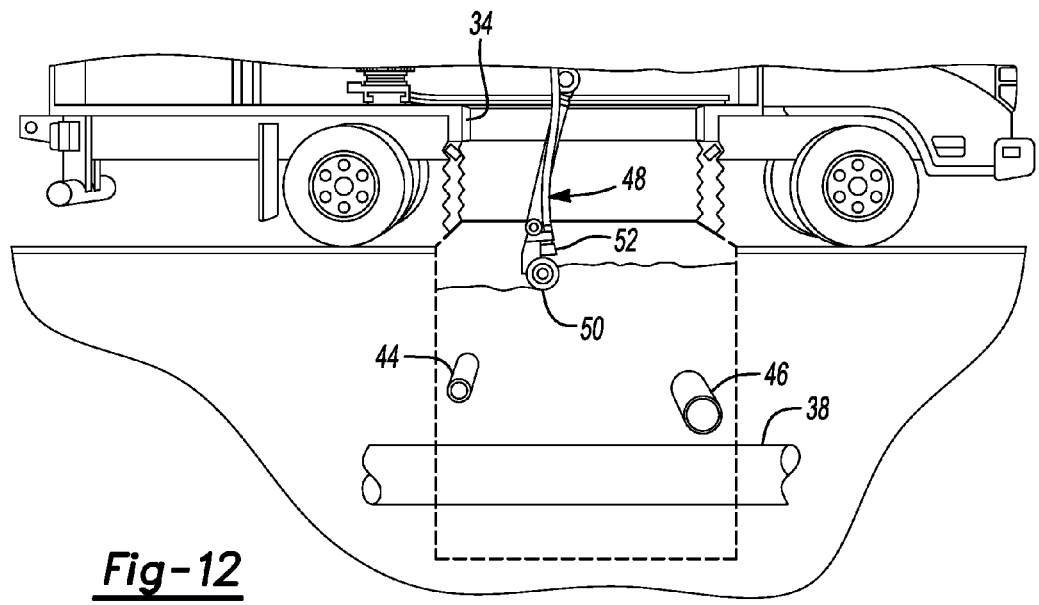
FIG. 12 shows vacuum excavation of the ground below the pavement at the excavation site.

As illustrated in FIG. 11, two additional pipelines 44 and 46 are identified. Once the relevant underground structures are identified, removal of the ground material can begin. Illustrated in FIG. 12 is one such system and method, which includes a vacuum excavation attachment 48 configured to be used by the robotic arm 16. The excavation attachment 48 includes rotating brushes 50 and a vacuum line 52, which may be attached to, for example, a vacuum excavation tank, such as the tank 23 shown in FIG. 1. Other types of concrete and asphalt removal may be employed by a system, such as the system 28. For example, conventional hydraulic keyhole coring can be used, or a pneumatic concrete breaker may be employed, which is possible because of the relatively large hatch opening provided through the floor of the vehicle bed. In addition, rather than using rotating brushes, such as the rotating brushes 50, an excavation attachment may include such features as dry ice blasting, or other mechanical or vibratory systems to loosen the ground material for easy removal.

Although the description and illustrations referenced above relate to the use of a saw and vacuum excavation, other types of tools and tool systems utilizing different access and excavation techniques may be employed. For example, a jackhammer could be disposed through the hatch 34 to break up the street material, rather than cutting and drilling it as shown in FIG. 10. Excavation through the hatch 34 may be performed with a small bucket, which, like the jackhammer, could be articulated on the end of the robotic arm 16. As noted above, standard keyhole drilling techniques and tools, and the processes and tasks associated with them—generally well known in the art—could be employed through the access of the hatch 34, rather than in the open and publicly visible as they are currently performed. In addition to repairing pipelines, or placing new pipelines in the ground, embodiments of the present invention may also be used to place and tie together rebar. The repair of potholes, including trimming the hole and placing the fill material can also be performed through a hatch, such as the hatch 34, thereby isolating and protecting the road workers.

Tools for water jetting and water cutting, and their associated processes, are other tools and techniques that can be employed through a vehicle opening such as the hatch 34, providing the benefits of limited public visibility and worker safety. It is clear from the above descriptions that the term "excavation" as used with reference to embodiments of the present invention is not limited to major digging and removal of street and ground material. Rather, as used herein and absent any other specific limiting definition, the term "excavation" includes virtually any process that moves, removes, or both, material such as soil, rocks, concrete, etc., including keyhole drilling and core drilling, and further includes actions performed on very small amounts of material as well as much larger quantities. In addition, the tools associated with these processes may be more traditional excavation tools such as a jackhammer and bucket, but may also include drills, core drills, saws and other tools useful for effecting utility access or maintenance. Other tools, such as traditionally hand-held or machine operated tools—e.g., screwdrivers, pliers, cutters, robotic manipulators, etc.—can be used in conjunction with embodiments of invention.

Figure 13:
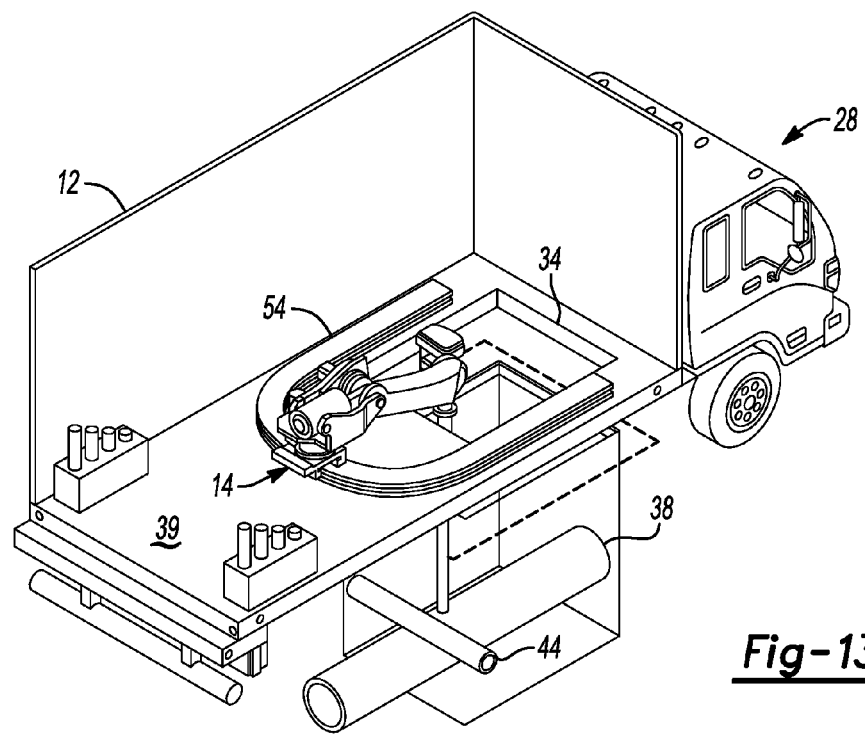
FIG. 13 shows the system performing work on the underground pipeline.

FIG. 13 shows the robotic system 14 accessing the pipeline 38 through the opening 34 in the bed of the vehicle 12. In order to facilitate controlled movement of the robotic system 14, and in particular the robotic arm 16, in relation to the pipeline 38 or other underground structures, a gantry 54, or other guide system, may be installed in the vehicle 12. Although the guide 54 is illustrated in FIG. 13 as being mounted to the bed 39 of the vehicle 12, in other embodiments a gantry or other guide system may be mounted to other portions of the vehicle, for example on the inside of the vehicle roof. Once an underground structure such as the pipeline 38 is accessed, the robotic system 14 can perform any of a number of different operations, such as the installation of fittings and valves, as well as small-diameter main tapping and completion. As described above, cameras and machine vision can be used in conjunction with these processes, for example, to precisely locate and identify structures once they are accessed. Although it is contemplated that an operator may drive a vehicle, such as the vehicle 12, to an excavation site, the entire operation of the robotic system, including the excavating, removal of material and subsequent work on the underground structures, may be controlled remotely, thereby providing additional safety for technicians and other utility workers. Of course, with the advent of driverless vehicles, the vehicle may be navigated to the sight without a driver.

Figure 14:
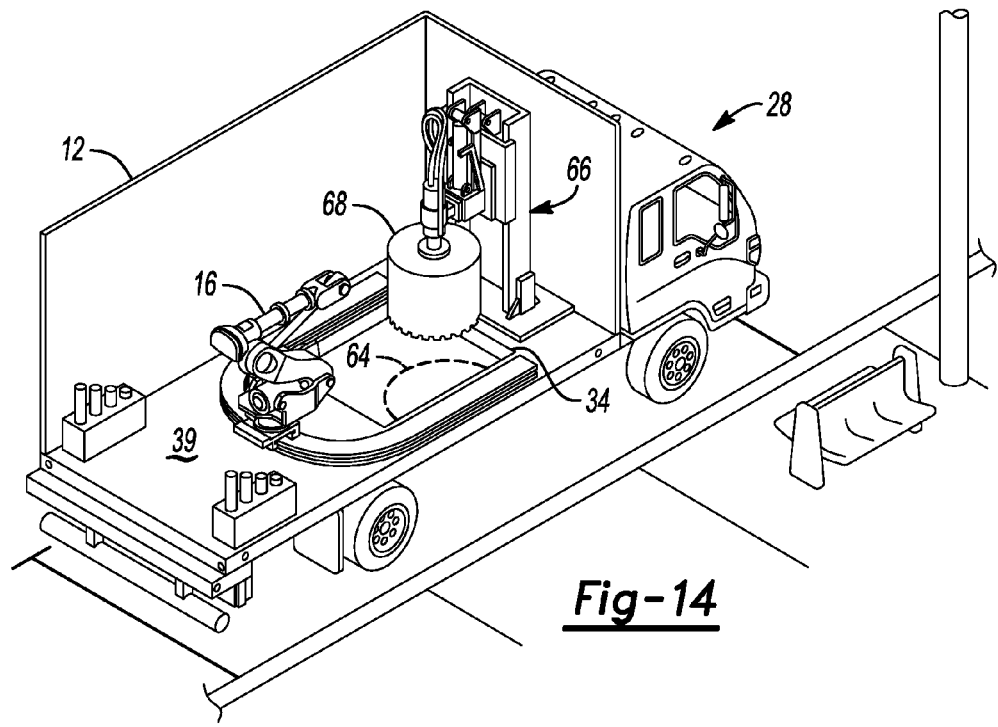
FIG. 14 shows the system located over a different site and including a core drill system.
Figure 15:
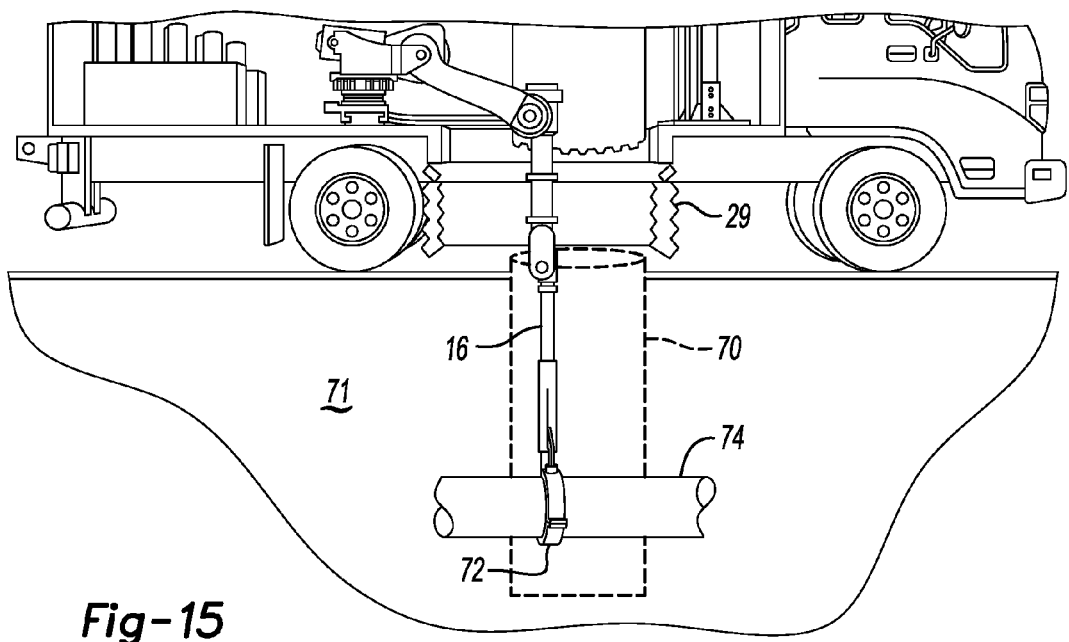
FIG. 15 shows the system installing a clamp on a pipeline through a core-drilled hole.

FIG. 14 shows the system 28 after it has been moved to a different site as indicated by the markings 64 on the ground below the vehicle 12. As shown in FIG. 14, the system 28 has been fitted with a core drill system 66, which includes a tool, and more specifically, a large core drill 68. Use of a core drill, such as the core drill 68, can provide fast and direct access to underground structures without the need for a larger excavation. The core drill 68 is deployable through the floor opening 34 for operation, and is operable within the barrier curtain 29—see FIG. 15—to drill a hole 70 in the ground 71 below the vehicle 12. As shown in FIG. 15, the robotic arm 16 is deployed through the hole 70 to attach a clamp 72 to a pipeline 74. This may be useful, for example, where a clamp is used to provide a seal for a small leak or to provide additional strength at a point on the pipeline 74. Thus, any number of actions can be taken on existing structures, or new structures may be installed, using a self-contained system characterized by embodiments of the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for utility maintenance, comprising:
  a vehicle having at least one front wheel and at least one rear wheel, an at least partially enclosed interior space and a selectively openable floor portion disposed at least partially between the at least one front wheel and the at least one rear wheel, and movable between a closed position and an open position whereby a hatch having a hatch perimeter is defined and provides access to ground below the vehicle through a floor in the vehicle;

a barrier selectively positionable proximate to at least a portion of the hatch perimeter; and a tool at least partially disposed in the interior space of the vehicle and configured for deployment through the hatch and operable within the barrier to penetrate the ground below the vehicle such that a buried utility structure is accessible through the hatch.

2. The system of claim 1, wherein the tool is an excavation tool, and the system further comprises a plurality of the excavation tools, including at least an excavation tool operable to penetrate street material and an excavation tool operable to remove material from the ground below the vehicle.

3. The system of claim 1, further comprising a robotic system including a robotic arm disposed within the at least partially enclosed interior space and operable to manipulate the tool to perform excavation.

4. The system of claim 3, further comprising a sensor arrangement configured to be articulated by the robotic arm for sensing at least one parameter related to the excavation.

5. The system of claim 4, wherein the sensor arrangement includes at least one of a ground-penetrating radar, a gas detection sensor, an electromagnetic detection sensor, a ferromagnetic sensor, a LiDar sensor, or an optical recognition device.

6. The system of claim 1, wherein the selectively openable floor portion includes at least one door configured such that when the selectively openable floor portion is in the open position, the at least one door forms at least a part of the barrier.

7. The system of claim 1, wherein the barrier includes a curtain deployable through the hatch and comprising at least one piece of flexible material.

8. The system of claim 4, wherein the sensor arrangement includes at least one sensor configured to locate a utility structure disposed below the ground.

9. A method for utility maintenance, comprising:

locating an underground utility structure;

moving a vehicle structure defining an interior space to a predetermined location;

positioning the interior space over the underground utility structure at the predetermined location;

moving at least a portion of a floor within the interior space from a closed position to an open position to create an opening in the floor; and excavating the ground below the floor by operating a tool through the opening in the floor, at least a portion of the tool being disposed in the interior space.

10. The method of claim 9, further comprising extending a barrier from the opening in the floor toward the ground at the site.

11. The method of claim 10, wherein the floor includes a movable door, and the step of extending a barrier includes opening the door downward to form at least a part of the barrier.

12. The method of claim 10, wherein the step of extending a barrier includes deploying a curtain through the opening in the floor.

* * * * *

UNITED STATES PATENT AND TRADEMARK OFFICE
CERTIFICATE OF CORRECTION

PATENT NO. : 9,945,092 B2
APPLICATION NO. : 14/976101
DATED : April 17, 2018
INVENTOR(S) : G. Gregory Penza et al.

It is certified that error appears in the above-identified patent and that said Letters Patent is hereby corrected as shown below:

On the Title Page

Insert:
-- Related U.S. Application Data
(60) Provisional application No. 62/094,748 filed on December 19, 2014 --

Signed and Sealed this
Fourth Day of December, 2018

Andrei Iancu
*Director of the United States Patent and Trademark Office*